United States Patent Office 3,299,092
Patented Jan. 17, 1967

3,299,092
NAPHTHOLACTAM REACTION PRODUCTS AND PROCESS FOR PREPARATION OF THE SAME
Alfred Brack, Leverkusen, Germany, assignor to Farbenfabriken Bayer Aktiengesellschaft, Leverkusen, Germany, a corporation of Germany
No Drawing. Filed Apr. 2, 1964, Ser. No. 356,979
Claims priority, application Germany, Apr. 6, 1963, F 39,425
11 Claims. (Cl. 260—313.1)

The present invention relates, in general, to new heterocyclic compounds which have been found to be useful as dyestuffs and intermediates for use in the production of dyestuffs.

Thus, it has been found that new heterocyclic compounds as represented by the formula:

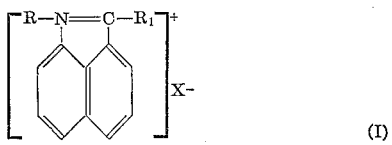

(I)

may be produced by reacting naphtholactams of the formula:

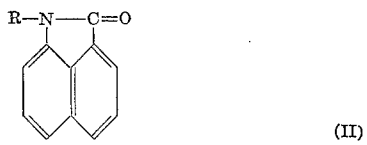

(II)

with organo-metallic compounds of the formula:

$$(R_1)_n MeY_{(w-n)} \qquad (III)$$

where R represents a lower alkyl radical of at least two (2) carbon atoms chain-length, cycloalkyl, aralkyl or aryl radical; $R_1$ represents an alkyl, cycloalkyl, aralkyl or aryl radical; X represents an anion; Y represents a monovalent acid radical; $n$ is an integer from 1 to 3; Me represents the radical of a mono- to trivalent metal such as an alkali metal, e.g., lithium, sodium or an element of the second main or sub-group such as magnesium and zinc, or a trivalent element such as aluminum; and $w$ represents a number corresponding to the valency of the metal Me. The radicals R, $R_1$ as well as the naphthalene ring can also carry non-ionic substitutents.

Suitable organo-metallic compounds useful in effecting the process of the invention include, for example, Grignard reagents of the general formula $$R_1—Mg—Y \qquad (IV)$$

wherein $R_1$ and Y have the same meaning as defined above. Also of use are the di-organo-magnesium compounds represented by the formula:

$$(R_1)_2 Mg \qquad (V)$$

wherein, again, $R_1$ has the same meaning as defined above, and, quite generally, those organo-metallic compounds whose reactivity corresponds to the organo-magnesium compounds, although some differences in the reactivity frequently exist. As typical examples, there may be mentioned the alkali metal derivatives, principally the organo-lithium and -sodium compounds, on the one hand, and the organo-zinc and aluminum compounds, on the other hand. Specific examples include inter alia: methyl-magnesium chloride, -bromide, -iodide and -methosulphate; ethyl-magnesium chloride; n-propyl-magnesium bromide; i-butyl-magnesium iodide; cyclohexyl-magnesium bromide; benzyl-magnesium chloride; 4-methyl-benzyl-magnesium chloride; phenyl-magnesium-chloride, -bromide and -iodide; 4-bromophenyl-magnesium bromide; 4-dimethylaminophenyl-magnesium bromide and iodide; 1-(2-methoxy-naphthyl)-magnesium bromide; dimethyl-magnesium; diethyl-magnesium; diphenyl-magnesium; methyl-lithium; phenyl-lithium; phenyl-sodium; methyl-zinc chloride; dimethyl-zinc; phenyl-zinc iodide; trimethyl-aluminum; dimethyl-aluminum chloride; and methyl-aluminum dichloride.

Suitable lactams of the general formula indicated above include, for example,

N-methyl-naphtholactam-(1,8);
N-ethyl-naphtholactam-(1,8);
N-isopropyl-naphtholactam-(1,8);
N-n-butyl-naphtholactam-(1,8);
N-iso-amyl-naphtholactam-(1,8);
N-benzyl-naphtholactam-(1,8);
N-4'-methylbenzyl-naphtholactam-(1,8);
N-cyclohexyl-naphtholactam-(1,8);
N-phenyl-naphtholactam-(1,8);
N-4'-methoxyphenyl-naphtholactam-(1,8);
N-methyl-4-bromo-naphtholactam-(1,8);
N-methyl-2,4-dibromo-naphtholactam-(1,8);
N-ethyl-4-bromo-naphtholactam-(1,8);
N-methyl-2,4-dibromo-naphtholactam-(1,8);
N-ethyl-2,4-dichloro-naphtholactam-(1,8);
N-ethyl-4-methoxy-naphtholactam-(1,8);
N-ethyl-4-dimethylamino-naphtholactam-(1,8); and
N-naphthyl[1']-naphtholactam-(1,8).

The reaction mechanism of the invention can be effected in usual manner within an organic media customary for reactions with organo-metallic reagents as, for example, in diethyl ether, di-n-propyl ether, di-iso-amyl ether, anisole, tetrahydrofuran, benzene, cyclohexane, n-hexane or n-heptane. It is possible, but not necessary, to isolate the required organo-metallic compound before the reaction with the compounds represented by the formula:

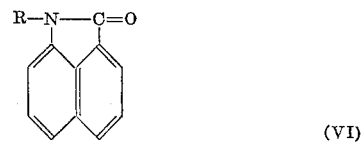

(VI)

The reaction temperature depends upon the reactivity of the organo-metallic component. For compounds of the type $R_1$—Mg—X temperatures between 20° and 100° C. are generally sufficient.

The hitherto known reactions of lactams with Grignard compounds lead either to dehydrogenated compounds or to dialkylated compounds, or they give rise to ring cleavage, as has been demonstrated by Kharasch and Reinmuth in "Grignard Reactions of Nonmetallic Substances," New York, Prentice-Hall Inc. (1954), pages 878–879. It was therefore surprising that the salt-like compounds of Formula I are obtained by the process of the invention.

The new compounds find direct utility as dyestuffs and intermediates for use in the production of dyestuffs.

It is believed that the foregoing principles and procedures of the invention may be best understood by reference to the following specific examples illustrating the application of the same to the production of typical compounds of the invention:

*Example 1*

A Grignard solution prepared in usual manner from 3.5 parts of magnesium, 80 parts of diethyl ether and 20 parts of methyl iodide was added dropwise at —5° to 0° C. to a solution of 19.8 parts of N-ethyl-naphtholactam-(1,8) in 200 parts of dry diethyl ether. Care was taken by means of rapid stirring that the yellow precipitate which separated immediately was dispersed as finely as possible. The slurry was stirred at about 0° C. for 10–20 minutes, then heated to boiling and the mixture kept at this temperature under reflux for one hour. After cooling, a mixture of 150 parts of water and 20 parts of concentrated hydrochloric acid was added dropwise at 10–20° C., followed by suction-filtration. The yellow residue recovered was the compound of the formula:

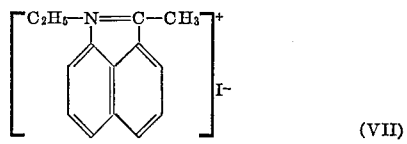

The compound can be obtained completely pure by recrystallization from water or dilute hydrochloric acid. The yield is very good.

*Analysis.*—Found: C, 52.0, 52.8; H, 4.6, 4.6; N, 4.3, 4.4; I, 39.9. Calculated: C, 52.0; H, 4.3; N, 4.3; I, 39.4.

When using, instead of N-ethyl-naphtholactam, the equivalent amount of N-methyl- or N-n-butyl-naphtholactam-(1,8), the experimental technique being otherwise unchanged, the corresponding N-methyl and N-n-butyl compounds, respectively, are obtained.

*Example 2*

A solution of 39.4 parts of N-ethyl-naphtholactam-(1,8) in 200 parts of tetrahydrofuran was run at 20–25° C. into a Grignard solution prepared from 8 parts of magnesium and 300 parts of tetrahydrofuran by introducing methyl chloride at 10–25° C. The mixture was stirred at room temperature for one hour and under reflux for 5 hours and then allowed to cool slowly. Upon the dropwise addition of a mixture of 152 parts of water and 45 parts of concentrated hydrochloric acid, the salt of the formula:

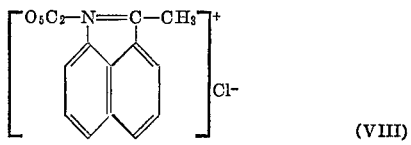

precipitated in almost quantitative yield.

*Analysis.*—Found: C, 72.4, 72.7; H, 6.2, 6.3; N, 5.9, 6.2; Cl, 15.7. Calculated: C, 72.6; H, 6.0; N, 6.0; Cl, 15.4.

When using methyl bromide instead of methyl chloride, the experimental technique being otherwise unchanged, the corresponding bromide may be obtained.

*Example 3*

Four (4) parts of magnesium and 1 part of magnesium previously activated with methyl iodide were added to a solution of 5 parts of freshly distilled dimethyl sulphate in 25 parts of tetrahydrofuran. The reaction started immediately. A solution of 20.5 parts of freshly distilled dimethyl sulphate in 75 parts of tetrahydrofuran was then added dropwise at 30–40° C., and the mixture was stirred at this temperature until the magnesium had almost dissolved. A solution of 20 parts of N-ethylnaphtholactam-(1,8) in 100 parts of tetrahydrofuran was then run in at 10–20° C. The solution was stirred at 20° C. for 30 minutes and then at boiling temperature for 4 hours. The mixture was allowed to cool and decomposed with a mixture of 25 parts of concentrated hydrochloric acid and 200 parts of water. The tetrahydrofuran was subsequently distilled-off under reduced pressure. The resulting blue-green aqueous solution was boiled with 1 part of active charcoal, and filtered. From the now yellow filtrate the salt of the formula:

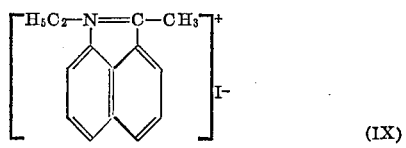

precipitated upon the addition of a sodium iodide solution.

*Example 4*

A solution of 55 parts of 4-bromo-N-ethyl-naphtholactam-(1,8) in 200 parts of tetrahydrofuran was added dorpwise at 10–15° C. to a methyl-magnesium chloride solution prepared according to the procedure outlined in Example 2. The mixture was then heated to boiling and kept at boiling temperature for 4 hours. After cooling, the reaction mixture was decomposed with 200 parts of 12% hydrochloric acid, whereby the salt of the formula:

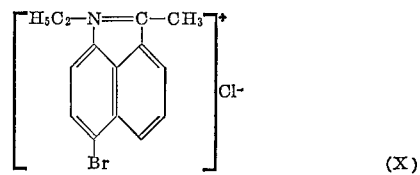

precipitated. It can be purified by dissolving in water and salting out with a saturated common salt solution, if desired.

*Analysis.*—Found: C, 54.3, 54.5; H, 4.5, 4.4; N, 4.4, 4.7. Calculated: C, 54.1; H, 4.2; N, 4.5.

When using, instead of 4-bromo-N-ethyl-naptholactam, the equivalent amount of 2,4-dibromo-N-ethyl-naptholactam-(1,8), the experimental technique being otherwise unchanged, the salt of the formula:

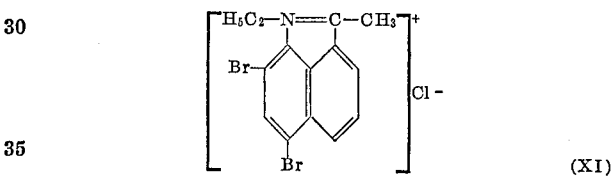

may be obtained.

*Example 5*

One hundred and fifty (150) parts of N-methyl-naptholactam-(1,8) were added at 0–10° C. to a phenyl-magnesium chloride solution prepared in usual manner from 25 parts of magnesium, 113 parts of chlorobenzene and 1200 parts of diethyl ether, and the resulting solution was stirred at room temperature for 1 hour and subsequently under reflux for 8 hours. After cooling, 1000 parts of 12% hydrochloric acid were added dropwise. The ether layer was separated and the aqueous layer cooled to about 5° C. The crude product which was filtered-off with suction can be purified by recrystallization from 2–5% hydrochloric acid; it corresponds to the formula:

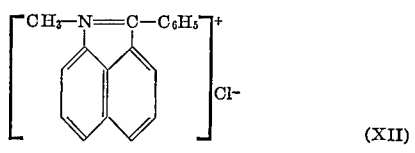

*Example 6*

Five (5) parts of magnesium were covered with 40 parts of diethyl ether. A solution of 48 parts of 1,4-dibromobenzene in 200 parts of diethyl ether was added dropwise at 30–34° C., and the mixture maintained at this temperature until the magnesium was dissolved. A solution of 20 g. of N-ethyl-naphtholactam-(1,8) in 200 ml. of diethyl ether was then added dropwise at 30–34° C., care being taken by rapid stirring that the resultant yellowish precipitate was evenly and finely dispersed. After boiling for one hour the mixture was decomposed at 20–30° C. in usual manner with a mixture of 40 parts of concentrated hydrochloric acid and 200 parts of water, and the ether was distilled-off. After the addition of 500 parts of water, the residual mixture was heated to boiling, stirred with 1–2 parts of active charcoal for 5 minutes filtered while hot. The salt of the formula:

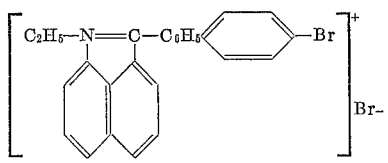

(XIII)

separated from the filtrate in the form of yellow-brown crystals.

*Analysis.*—Found: C, 54.8, 54.5; H, 3.9, 4.0; N, 3.5, 3.5; Br, 38.1. Calculated: C, 54.6; H, 3.6; N, 3.4; Br, 38.4.

All the analysis data given in the foregoing examples are percentage figures.

What is claimed is:

1. Process for the production of a naptholactam reaction product that comprises reacting a naphtholactam of the formula:

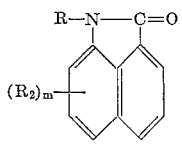

wherein R is a member selected from the group consisting for a lower alkyl of 2–5 carbon atoms, cyclohexyl, benzyl, methylbenzyl, phenyl, methoxyphenyl, and naphthyl; $R_2$ is a member selected from the group consisting of hydrogen, bromo, chloro, methoxy, and dimethylamino; and $m$ is an integer from 1 to 2, with an organo-metallic compound of the formula:

$$(R_1)_n MeY_{(w-n)}$$

wherein Me is a member selected from the group consisting of lithium, magnesium, zinc, and aluminum; $R_1$ is a lower alkyl of 1–4 carbon atoms; Y is a monovalent acid radical selected from the group consisting of chloride, bromide, iodide, and methylsulfate; $n$ is an integer from 1–3; and $w$ is a number corresponding to the valence of said metal Me.

2. The process as claimed in claim 1, wherein the naptholactam is reacted with a member selected from the group consisting of methyl-magnesium chloride; methyl-magnesium bromide; methyl-magnesium iodide; methyl-magnesium methosulfate; dimethyl-magnesium; and mixtures of the same.

3. The process is claimed in claim 1, wherein said reaction is carried out in tetrahydrofuran.

4. The chemical compound represented by the formula:

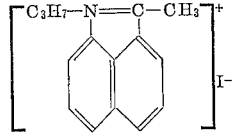

5. The chemical compound represented by the formula:

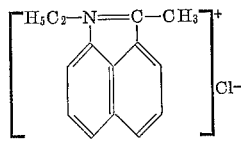

6. The chemical compound represented by the formula:

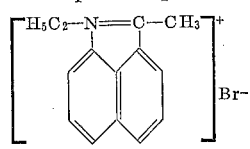

7. The chemical compound represented by the formula:

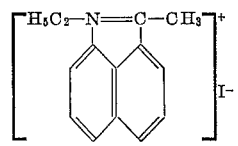

8. The chemical compound represented by the formula:

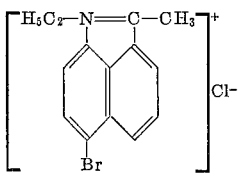

9. The chemical compound represented by the formula:

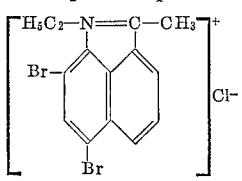

10. The chemical compound represented by the formula:

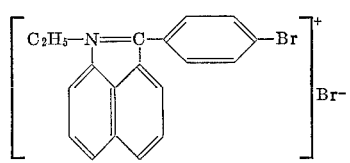

11. A naphtholactam reaction product represented by the formula:

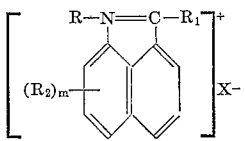

wherein R is a member selected from the group consisting of a lower alkyl of 2–5 carbon atoms, cyclohexyl, benzyl, methylbenzyl, phenyl, methoxyphenyl, and napthyl; $R_1$ is a lower alkyl of 1-4 carbon atoms; $R_2$ is a member selected from the group consisting of hydrogen, bromo, chloro, methoxy, and dimethylamino; $m$ is an integer from 1–2; and x is an anion of an acid.

References Cited by the Examiner

UNITED STATES PATENTS 1,762,021   6/1930   Kranzlein et al. _____ 260—313

FOREIGN PATENTS 289,692   5/1958   Great Britain.
116,643   1/1959   U.S.S.R.

OTHER REFERENCES

Kharasch et al.: Grignard Reactions of Nonmetallic Substances, New York, Prentice-Hall, Inc., 1954 pp. 878–879 and 902–903.

Migrdichian: Organic Synthesis, vol. 1, New York, Reinhold Pub. Corp., 1957, pp. 558–559.

ALEX MAZEL, *Primary Examiner.*

HENRY R. JILES, *Examiner.*

M. U. O'BRIEN, *Assistant Examiner.*